United States Patent

Lee

[11] 4,052,957
[45] Oct. 11, 1977

[54] BURGEES

[76] Inventor: George Herbert Lee, Willowbrook, Lon Hawen, Abersoch, Pwllheli, Gwynedd, Wales, LL53 7EW

[21] Appl. No.: 639,731

[22] Filed: Dec. 11, 1975

[51] Int. Cl.² .................... G01W 1/00; G09F 17/00
[52] U.S. Cl. ............................... 116/174; 73/188; 116/173
[58] Field of Search .............. 73/188, 189; 116/173, 116/174, 175

[56] References Cited

U.S. PATENT DOCUMENTS

| 721,348 | 2/1903 | Wilson | 73/188 |
|---|---|---|---|
| 1,383,234 | 6/1921 | Raguse | 116/173 |
| 1,742,574 | 1/1930 | Breedlove | 73/188 |
| 2,465,999 | 4/1949 | Brady | 73/188 |

Primary Examiner—S. Clement Swisher
Assistant Examiner—Denis E. Corr
Attorney, Agent, or Firm—Seidel, Gonda & Goldhammer

[57] ABSTRACT

A burgee, particularly for boats and yachts, and comprising a flag mounted on a frame carried by a staff is enabled to be more sensitive by providing a pivot bearing mounting for the frame on the staff. The pivot is preferably a pointed tip to the staff bearing against a flat surface provided by the frame. The frame may be made from a single length of wire or strip material, appropriately bent to shape, and may include a loop to the side of the staff opposite to the flag.

5 Claims, 3 Drawing Figures

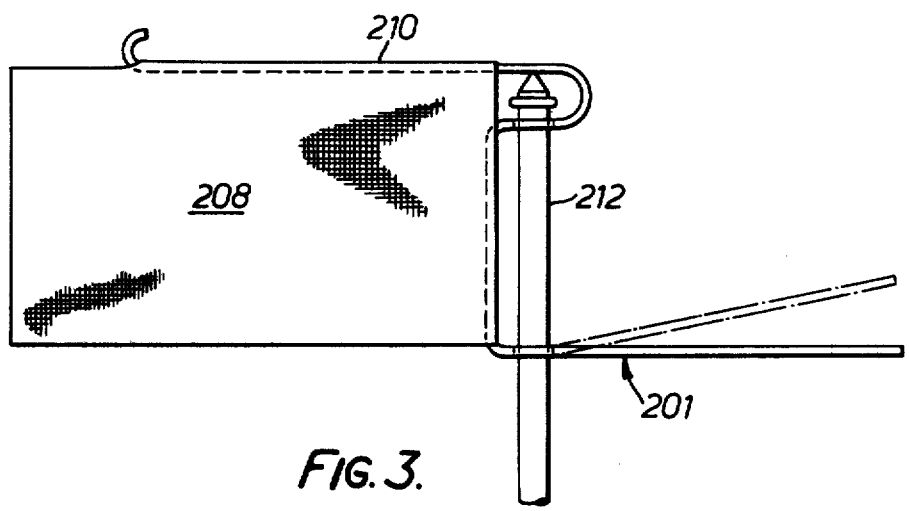

BURGEES

FIELD OF THE INVENTION

This invention relates to burgees, particularly for boats and yachts.

Burgees generally comprise a frame, often of wire, arranged to carry a flag and to be carried on a staff which can be secured to the top of a mast of a marine vessel to indicate the direction of the prevailing wind. The frame is rotatable on the staff so that the flag assumes positions about the mast dictated by the wind direction. The speed and accuracy with which the wind direction is indicated primarily depends upon the friction between the frame supporting the flag and the staff upon which the frame is mounted.

DESCRIPTION OF THE PRIOR ART

Burgee frames of known construction and to which the flag is sewn have been formed from wire with the weight of the flag and frame being taken on a collar or washer located at the top of the staff, the lower part of the wire frame being looped around the staff to form a bearing for the frame. However, this known arrangement generates considerable friction between the staff and the frame and is not sensitive to light winds.

SUMMARY OF THE INVENTION

In the case of sailing vessels, particularly when a vessel is being sailed in racing events, it is important that the frame rotates easily on the staff with a minimum of friction so that the flag responds quickly to the lightest wind, and the yachtsman can then use this to the maximum advantage.

It is the primary object of the present invention to provide a burgee where the friction between the frame and the staff is reduced to a minimum.

In accordance with the present invention there is provided a burgee comprising a frame on which a flag or flag assembly is arranged to be supported, the frame incorporating means permitting the frame to be mounted on a staff for rotational movement about the axis of the staff, and pivot bearing means effective between a part of or connected to said frame and a part of or connected to the upper end of the staff.

The use of a pivot bearing between the frame and the staff greatly reduces the friction and increases the sensitivity of the burgee.

In one embodiment, the pivot bearing means comprises a pointed element forming part of or secured to the staff and arranged to bear against a flat or arcuate surface provided by the frame.

Various types of frames may be used, as will be apparent hereinafter. The frame may be formed from a single continuous length of wire, appropriately bent to shape, or from strip material. In the case of strip material it may be apertured to provide for the retention therein of the staff.

Preferably, the frame mounted on the staff co-acts with the staff at two vertically spaced places, apart from the pivot bearing, to provide support and guidance for the frame. The frame may be formed with a loop on the side of the staff opposite the flag as a counterbalance to the weight of the flag.

BRIEF DESCRIPTION OF THE DRAWINGS

A number of different forms of a burgee in accordance with the invention will now be described by way of example and with reference to the accompanying drawings, in which.

DESCRIPTION OF THE PREFERRED EMBODIMENT

Figure 1:
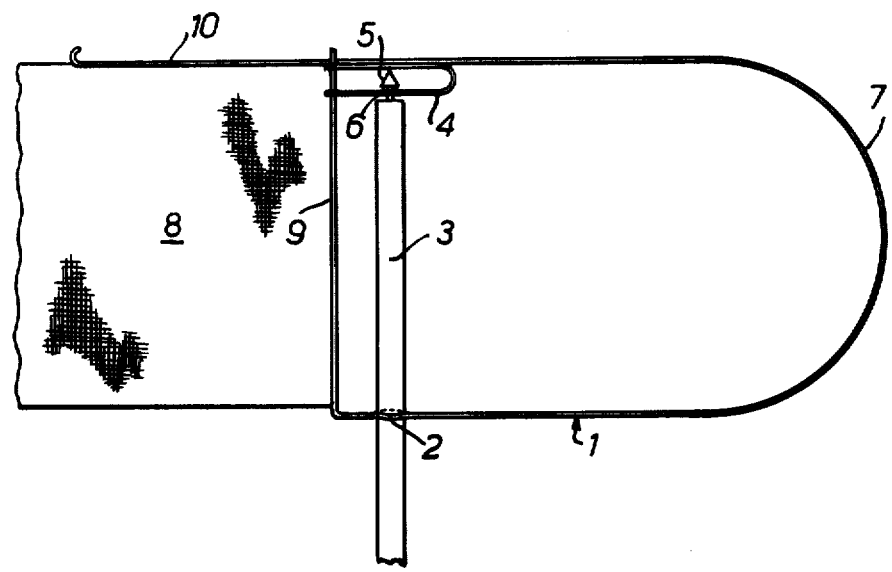
FIG. 1 is a schematic illustration of part of a first embodiment of a burgee according to the invention.

Referring first to FIG. 1, a frame 1 is formed with a bent piece of wire and includes a loop 2 which loosely encircles a vertical staff 3 at the lower edge of the frame and thereby forms a guide for the frame. The loop may be bent from the wire or be a separate loop or eye secured to the wire. A steel strip 4 bent into a U-shaped configuration has one arm of the U secured to the top edge of the frame 1 adjacent to the top of the staff 3, the underside of this one arm serving as a pivot bearing surface. A sharp-pointed conical member 5 is secured to the top of the staff 3 and has a narrow shank portion which passes through a hole in the other arm of the U-shaped strip 4 so that lateral support for the strip 4 and the frame is provided by the hole in said other arm and the apex of the conical member 5 in use abuts the flat underside of said one arm to form a pivot for the frame. A shoulder 6 on the member 5 and between the two arms prevents the frame 1 from being lifted off the staff 3. A loop portion 7 of the frame 1 of a desired size substantially balances the weight of a flag 8 secured to vertical and horizontal supporting portions 9, 10 respectively of the frame so that the downward force exerted on the member 5 by the total weight of the frame and flag is directed vertically downwards along the axis of the staff 3. The flag 8, if of fabric material, can be stitched to the wire portions 9 and 10, or alternatively the flag can be stuck by suitable adhesive means to the frame.

As illustrated, the upper arm of the U-shaped strip 4 is secured to the frame wire, such as by brazing or welding for example, and the vertical flag support portion 9 passes up through the free ends of the strip arms and is fixedly secured thereto.

Figure 2:
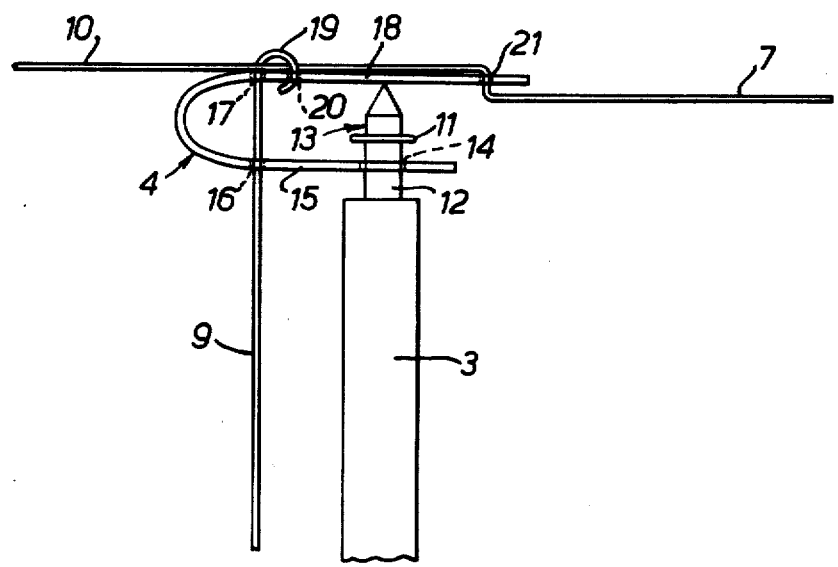
FIG. 2 shows an alternative pivot mounting of the burgee frame on the staff; and, FIG. 3 shows yet another and simplified embodiment of a burgee according to the invention.

FIG. 2 shows an alternative way in which the frame 1 can be secured to the U-shaped steel strip 4 and provide a pivot bearing for the frame on the staff. Here, a circlip 11 located in a circumferential groove (not shown) around a shank portion 12 of a sharp-pointed conical member 13 and having an outside diameter greater than the diameter of a hole 14 in the lower arm 15 of the U strip 4 prevents the frame 1 from being lifted off the staff 3. The hole 14 in the arm 15 is preferably sized so that it performs the function of a guide for the strip 4, and hence the frame, relative to the staff.

The end of the portion 9 of the wire frame passes upwardly through holes 16, 17 located in the lower and upper arms 15, 18 respectively of the U strip 4 and is bent into a loop 19 to pass downwardly and back through a hole 20 in the upper arm 18, and extreme end of the wire being bent to retain the wire in position with respect to the U strip. The upper edge portion 7 of the frame is here secured to the U-shaped strip 4 by passing upwardly through a hole 21 in the upper arm 18 and being bent to extend along the top surface of the upper arm 18 and to pass through the loop 19 in a flattened U-shape configuration, viewed in plan, so that the wire frame is securely held relative to the U strip 4 and is maintained in a desired shape. Balance between the flag on one side and the loop portion 7 of the frame on the other side of the pivot can be obtained, as in the first embodiment, by cutting off portions of wire from the end of the upper flag support element 10 or, in the case that the wire element 10 extends out beyond the flag, as is usually the case, by bending the outermost portion of the element 10 up or down.

Although the strip 4 is preferably made of steel, preferably stainless steel, it may be made of a plastics material or any other suitable material. It will be appreciated that such a material for the strip 4 should preferably be one which does not rust. In fact, it is preferable that the whole of the burgee, i.e. frame and staff and associated parts, should be made from non-corroding material in view of the conditions under which the burgee is used.

FIG. 3 shows a further embodiment of burgee in accordance with the invention. Here the frame 201 is made from strip material and a single length of strip material serves both to support the flag 208 and to provide the bearing frame. The strip material is appropriately bent to form an upper limb 210 the underside of which forms the bearing surface for the pivot point of the staff 212. The strip is bent twice through approximately 180° to form an intermediate horizontal limb which is provided with a hole for the staff 212, and to provide a lower horizontal limb which likewise has a hole therethrough for the staff. In this embodiment, instead of the frame forming a loop on the side opposite to the flag, the strip material merely extends out from the staff and can be cut to length or bent upwards for balancing purposes. The flag 208 is appropriately secured to the upper horizontal limb and to the vertical limb of the frame 201.

Alternative forms of pivot between the frame and the staff may be used. For example, one surface may be partspherical and the other surface arcuate, preferably concavely arcuate with respect to said one surface. Alternatively, the strip 4 or an equivalent element could bear the point pivot element and the upper end of the staff define a flat bearing surface therefor. However, it will be appreciated that different forms of pivot may be employed.

I claim:

1. A burgee comprising a flag, frame means on which the flag is carried, a staff on which the frame means is supported for rotational movement about the axis of the staff, and pivot bearing means effective between said frame means and the upper end of the staff, said frame means comprising a length of wire extending to one side of the staff for securement of the flag thereto and extending on the opposite side of the staff to provide a balance weight, the length of said frame means being variable so as to vary the balance of said burgee.

2. A burgee comprising a flag, frame means on which the flag is carried, a staff on which the frame means is supported for rotational movement about the axis of the staff, and pivot bearing means effective between said frame means and the upper end of the staff, said frame means co-acts with the staff at two spaced positions along the length of the staff in addition to the pivot bearing means, to provide support and guidance for said frame means, said frame means comprising a length of strip material apertured in two places with the staff extending therethrough.

3. A burgee as claimed in claim 2, in which said frame means comprises a first substantially horizontal strip portion having an aperture adjacent to one end thereof through which the staff upwardly extends, a second portion extending upwardly at 90° to said first portion and parallel to the staff, a third portion at 90° to said second portion and apertured to receive the staff therethrough, and a fourth portion formed by bending the third portion through substantially 180° to form a horizontal strip portion against which the upper end of the staff bears, the flag being mounted on said second and fourth strip portions.

4. A burgee comprising a flag, frame means on which the flag is carried, a staff on which the frame means is supported for rotational movement about the axis of the staff, and pivot bearing means effective between said frame means and the upper end of the staff, said frame means comprising a length of wire bent into a C-shaped form with adjacent to its lower end a loop encircling the staff and adjacent to its upper end a bearing element against which the upper end of the staff bears and through which the staff extends for support and guidance.

5. A burgee as claimed in claim 4, in which said bearing element is a C-shaped strip with its upper arm secured to the wire and defining a surface against which the upper end of the staff bears, and its lower arm apertured for the staff to extend therethrough, the portion of the staff upwardly beyond said lower arm being enlarged to prevent excessive upward movement of the bearing element and frame means.

* * * * *